T. C. SHEEHAN.
FORWARDING DEVICE FOR RAZOR BLADE GRINDING MACHINES.
APPLICATION FILED JUNE 30, 1910.
1,049,412.
Patented Jan. 7, 1913.
2 SHEETS—SHEET 1.
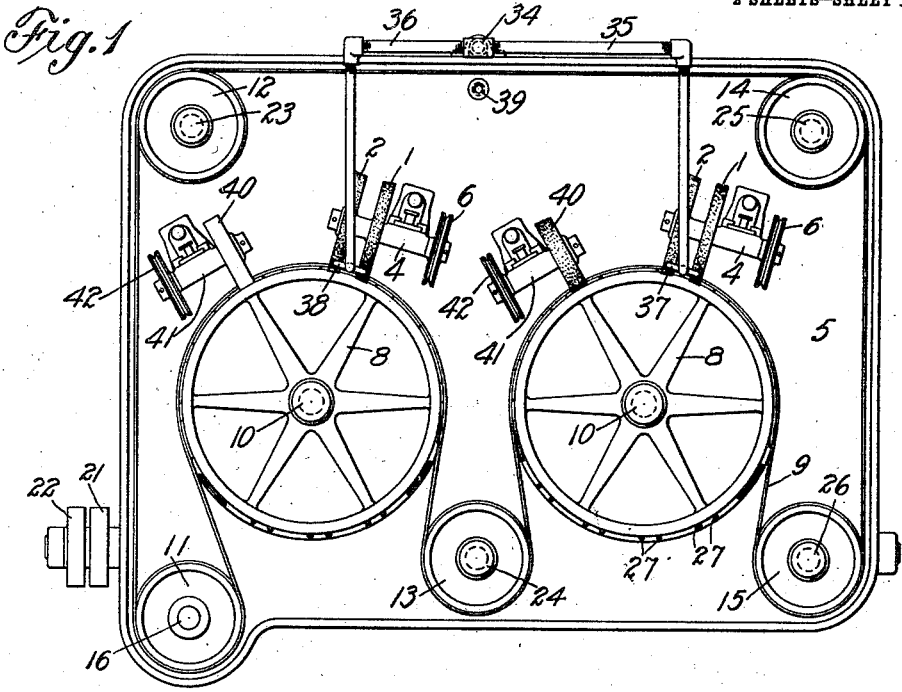
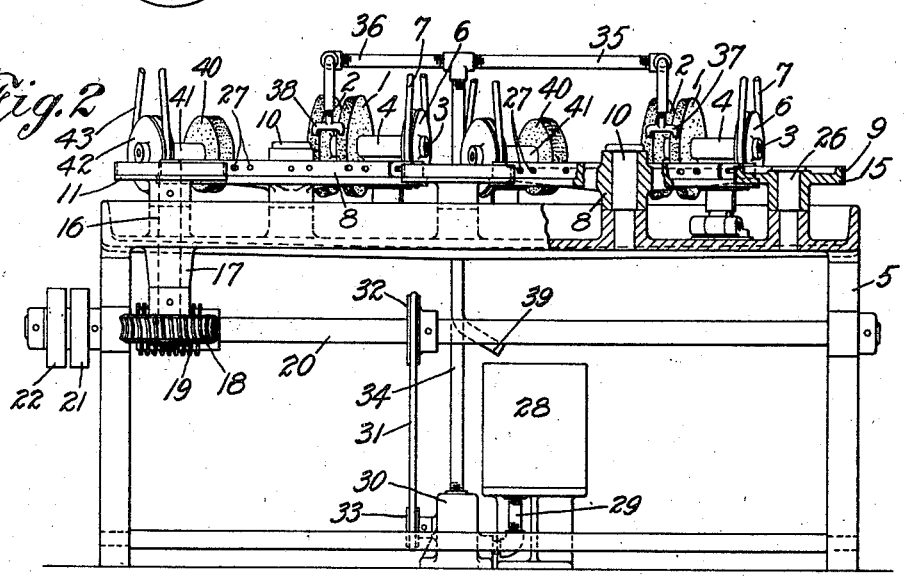

T. C. SHEEHAN.
FORWARDING DEVICE FOR RAZOR BLADE GRINDING MACHINES.
APPLICATION FILED JUNE 30, 1910.
1,049,412.
Patented Jan. 7, 1913.
2 SHEETS—SHEET 2.
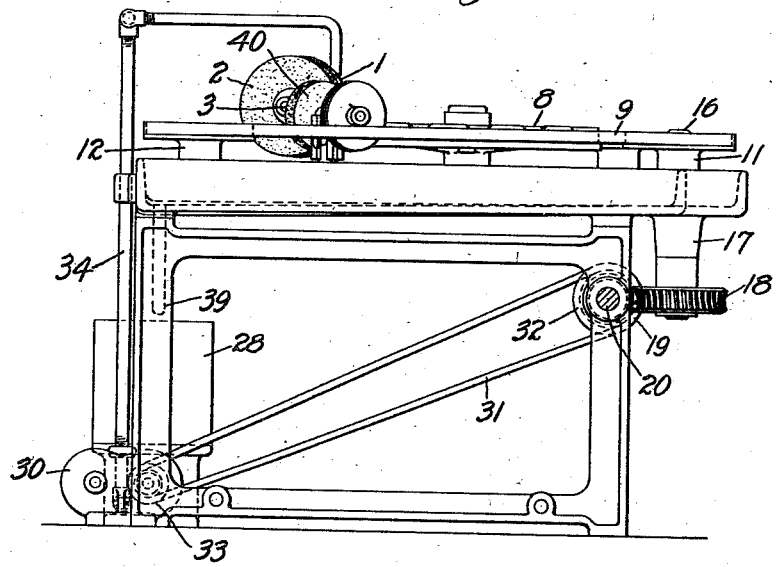
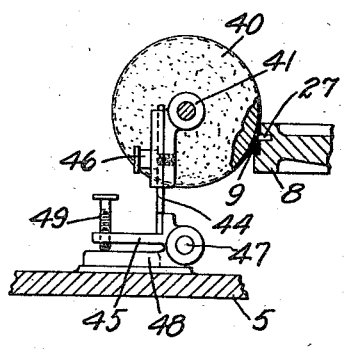
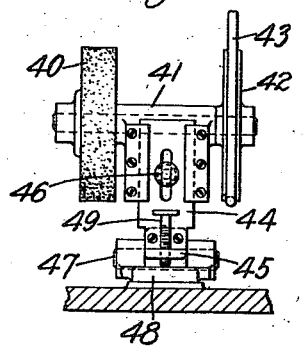
Attest
Frank H. Vick Jr.
Harry Shurtleff
Inventor
Thomas C. Sheehan
Sydney Prescott, Atty

UNITED STATES PATENT OFFICE.

THOMAS C. SHEEHAN, OF JERSEY CITY, NEW JERSEY, ASSIGNOR TO DURHAM DUPLEX RAZOR COMPANY, OF NEW YORK, N. Y., A CORPORATION OF NEW YORK.

FORWARDING DEVICE FOR RAZOR-BLADE-GRINDING MACHINES.

1,049,412. Specification of Letters Patent. Patented Jan. 7, 1913.

Application filed June 30, 1910. Serial No. 569,719.

*To all whom it may concern:*

Be it known that I, THOMAS C. SHEEHAN, a citizen of the United States, residing at Jersey City, county of Hudson, and State of New Jersey, have invented a new and useful Improvement in Forwarding Devices for Razor-Blade-Grinding Machines, of which the following is a specification.

This invention relates to an improvement in forwarding devices for razor blade grinding machines, particularly those machines used for grinding thin replaceable blades of the type used with certain safety razors; and having for their main object the production of a machine capable of rapidly and accurately grinding successive blades so that the cutting edges of all will be exactly alike.

Another object is to provide a machine for grinding blades in oil, whereby fine and true edges are produced without danger of injury to the temper of the steel.

Still another object is to provide a machine in which a blade is automatically carried past and held against the grinder so that the grinding operation is progressive from one end of the blade to the other and at all times uniform.

A further object is to provide a machine having a grinder including two separated disks, the first disk coming into contact with an advancing blade serving to remove the major portion of the material necessary to form the edge, while the second disk operates to finish the grinding operation under a lighter load and produce a smoother edge than is possible when only a single cut is made.

A further object is to provide a machine in which the ground edge is polished after the grinding operation is completed.

With these and other objects not specifically mentioned in view, the invention consists in certain constructions and combinations which will be hereinafter fully described, and then specifically set forth in the claims hereunto appended.

In the accompanying drawings which form a part of this specification and in which like characters of reference indicate the same parts, Figure 1 is a plan view of a machine constructed in accordance with the invention, Fig. 2 is a front elevation of the structure shown in Fig. 1, partly in section, Fig. 3 is a side elevation of the structure shown in Figs. 1 and 2, and Figs. 4 and 5 are detail views, upon an enlarged scale, of certain parts of the structure shown in Figs. 1, 2 and 3.

In carrying the invention into effect, there is provided a grinder which may vary within wide limits. In the best constructions, however, a grinding wheel is used, and this wheel may be made of any suitable abrasive material. In the device selected to illustrate the invention, the grinding wheel includes two separated disks 1 and 2 past which a blade is carried during the grinding operation in a manner to be hereinafter described. These disks are fixed upon a shaft 3 journaled in a bracket 4 adjustably mounted upon a frame 5 which is the main frame of the machine. Upon one end of this shaft is fixed a pulley 6 over which a belt 7 runs. This belt derives its motion from a suitable line shaft over the machine and not shown. It may be here remarked that in the device selected to illustrate the invention, there are two complete grinding wheels and two sets of blade forwarding devices. These wheels and devices are identical, and a detailed description of one is therefore thought to be sufficient to enable the invention to be fully understood.

Means are provided for forwarding a blade into the range of action of the grinder or grinding wheel, and this means may vary within wide limits. In the device selected to illustrate the invention, the forwarding means includes two traveling members which coöperate to carry a blade disposed between them into the range of action of the grinder. As shown, a rotating turret 8 is employed as one of the traveling members. Coöperating with this turret is a traveling belt 9 of steel or other suitable material. In certain constructions, the turret may be rotated by suitable mechanism, and the travel of the belt produced by the frictional contact of the same with the periphery of the turret. As shown, however, the turret is rotated by the belt. While in certain constructions, a single turret may be used; as shown, two turrets are employed and the belt coöperates with both. Each of the turrets is loosely mounted upon a stud 10 fixed in the frame 5 before referred to. The belt runs around the rear side of each turret and over pulleys 11, 12, 13, 14 and 15. The pulley 11 is fast on the upper end of a short shaft 16 journaled in a bearing 17 formed on the frame 5. Upon the lower end of this shaft is fixed a worm wheel 18 which is in mesh with a worm 19 carried by a shaft 20 which is the main power shaft of the machine. This shaft is provided with the usual fast and loose pulleys 21, 22. The pulleys 12, 13, 14 and 15 are idle pulleys and are loosely mounted upon studs 23, 24, 25 and 26 respectively. By the mechanism just described, the two turrets are rotated simultaneously and blades disposed between the turrets and belt are simultaneously forwarded and carried into the range of the grinders.

For the purpose of preventing any possible slip of a blade disposed between the turrets and belt, each of the turrets is provided with blade positioning devices. When perforated blades are to be operated upon, these devices consist in a series of blade positioning pins 27 adapted to engage the perforations of the blades to prevent displacement thereof.

For the purpose of enabling blades to be ground without danger of injury to the temper of the steel of which they are made, means are provided for producing a flow of oil to the surface of the grinder, and this means may vary within wide limits. As shown, however, a reservoir 28 is provided which contains oil of a suitable character. From this reservoir, a pipe 29 leads to a pump 30 of a well known type. Since a detailed description of this pump is unnecessary to an understanding of the present invention, it is omitted in the interest of brevity and clearness. The pump is driven by a belt 31 running over a pulley 32 on the shaft 20 before referred to, nd also over a pulley 33 on the pump shaft. The pump forces oil up through a pipe 34 to branch pipes 35 and 36 which terminate respectively in nozzles 37 and 38 adjacent the peripheral surfaces of the grinding wheels. A flow of oil is thus produced which prevents overheating of blades during the grinding operation. The oil that flows from the nozzles 37 and 38 drops from the wheels to the flanged table of the frame 5 and flows through a drain pipe 39 into the reservoir 28 from which it is again pumped to the wheels.

For the purpose of finishing the edge of a blade passed through the machine, without rehandling, there is provided a polisher or polishing wheel 40 operating upon the ground edge immediately after the grinding operation is completed. Each of the polishing wheels is mounted in a bracket 41 suitably positioned adjacent the periphery of the turrets, 8, and driven from an overhead shaft, not shown, by means of a pulley 42 and belt 43.

Means are provided for adjusting the grinders and polishers toward or away from the forwarding means or turret to compensate for wear and to regulate the depth of the cut taken from the side of the blade blank to form the cutting edge, and to regulate the degree of polish imparted to the ground edge. This means may vary within wide limits. As shown, however, the same means is employed for adjusting each of the grinders and each of the polishers; that is to say, means identical in structure is employed. The brackets 4 and 41 are arranged to be clamped upon the vertical arm 44 of a two arm lever 44, 45, by means of a clamp screw 46. The lever 44, 45 is pivoted at 47 to a support 48 secured to the frame 5 before referred to. An adjusting screw 49 is threaded through the horizontal arm 45 and contacts with the support 48. By this mechanism, the grinders or polishers may be adjusted vertically and also toward or away from the forwarding means or turrets.

In the operation of the device, blades are successively placed upon the pins 27 and guided between the periphery of the turrets and the coöperating belt, after which the blades are automatically forwarded to and past the grinders and polishers and back to a position at the front of the machine where they are taken from the pins.

Changes and variations may be made in the structure by means of which the invention is carried into effect. The invention, therefore, is not to be restricted to the precise details of the structure shown and described.

What is claimed is:

1. In a machine for grinding razor blades, the combination with a grinder, of blade forwarding means including a rotating turret and a coöperating belt running in the same direction between which a blade is disposed and carried into the range of action of the grinder.

2. In a machine for grinding razor blades, the combination with a grinder, of blade forwarding means including a traveling belt and a turret rotated by the belt between which a blade is disposed and carried into the range of action of the grinder.

3. In a machine for grinding razor blades, the combination with a grinder, of blade forwarding means including a traveling belt and a turret rotated by the belt and provided with blade positioning devices whereby a blade disposed between the belt and turret is carried into the range of action of the grinder.

4. In a machine for grinding razor blades, the combination with two grinders, of blade forwarding means including two rotating turrets and a traveling belt coöperating with both turrets, whereby blades disposed between the two turrets and the belt are simultaneously carried into the range of action of the two grinders.

5. In a machine for grinding razor blades, the combination with a grinding wheel, of a polishing wheel, and blade forwarding means including a rotating turret and a coöperating belt running in the same direction between which a blade is disposed and carried into the range of action of the grinding wheel and the polishing wheel.

6. In a machine for grinding razor blades, the combination with a grinding wheel, of a polishing wheel, and blade forwarding means including a traveling belt and a turret rotated by the belt between which a blade is disposed and carried into the range of action of the grinding wheel and the polishing wheel.

7. In a machine for grinding razor blades, the combination with a grinding wheel, of a polishing wheel, and blade forwarding means including a traveling belt and a turret rotated by the belt and provided with blade positioning devices, whereby a blade disposed between the belt and turret is carried into the range of action of the grinding wheel and the polishing wheel.

8. In a machine for grinding razor blades, the combination with two grinding wheels, of two polishing wheels, and blade forwarding means including two rotating turrets and a traveling belt coöperating with both turrets, whereby blades disposed between the two turrets and the belt are simultaneously carried into the range of action of the grinding wheels and the polishing wheels.

9. In a machine for grinding razor blades, the combination with two grinding wheels, of two polishing wheels, and blade forwarding means including a traveling belt and two turrets rotated by the belt, whereby blades disposed between the turrets and belt are simultaneously carried into the range of action of the grinding wheels and the polishing wheels.

In testimony whereof, I have signed my name to this specification in the presence of two subscribing witnesses.

THOMAS C. SHEEHAN.

Witnesses:
SYDNEY I. PRESCOTT,
FRANK H. VICK, Jr.